United States Patent [19]

Maida et al.

[11] Patent Number: 4,509,847

[45] Date of Patent: Apr. 9, 1985

[54] AUTOMATIC EXPOSURE CONTROL CAMERA HAVING A LOW BRIGHTNESS WARNING DEVICE

[75] Inventors: Osamu Maida, Tokyo; Mikio Takemae, Yokohama; Yuji Okubo, Omiya, all of Japan

[73] Assignee: Nippon Kogaku K.K., Tokyo, Japan

[21] Appl. No.: 491,303

[22] Filed: May 3, 1983

[30] Foreign Application Priority Data

May 10, 1982 [JP] Japan ................................. 57-77737

[51] Int. Cl.³ ........................ G03B 7/087; G03B 17/18
[52] U.S. Cl. ...................................... 354/442; 354/475
[58] Field of Search ............................. 354/441–445, 354/465, 467, 471, 474, 475

[56] References Cited

U.S. PATENT DOCUMENTS

4,358,188 11/1982 Uchidoi ............................... 354/443

Primary Examiner—William B. Perkey
Attorney, Agent, or Firm—Fitzpatrick, Cella, Harper & Scinto

[57] ABSTRACT

A camera in which light-sensing means is exposed to the light from an object to be photographed passed through stop means includes means for setting the aperture value of the stop means, means for driving the stop means in a direction in which the aperture value of the stop means is coincident with the aperture value by the setting means, prior to the exposure of the light-sensing means, metering means including a light-receiving element adapted to receive the light from the object passed through the stop means and produce an output corresponding to the intensity of the received light, the metering means producing a metering output corresponding to the brightness of the object on the basis of the output of the light-receiving element, means for controlling the exposure time of the light-sensing means in order that the light-sensing means may obtain a proper exposure, on the basis of the metering output after the stop means has been driven by the driving means, and discriminating means for discriminating, prior to the driving of the stop means, that the intensity of the light received by the light-receiving element after the termination of the driving of the stop means is lower than a predetermined value, on the basis of the metering output before the stop means is driven by the driving means, and putting out a discrimination signal.

17 Claims, 6 Drawing Figures

AUTOMATIC EXPOSURE CONTROL CAMERA HAVING A LOW BRIGHTNESS WARNING DEVICE

BACKGROUND OF THE INVENTION

1. Field of the Invention

This invention relates to an automatic exposure control camera having a low brightness warning device.

2. Description of the Prior Art

The metering systems for automatic exposure control of single lens reflex cameras include, for example, the TTL open metering system disclosed in U.S. Pat. No. 3,641,890 and the TTL stop-down metering system disclosed in U.S. Pat. No. 4,204,755. In the automatic exposure control by the TTL open metering system, open metering is effected before exposure control and the metering value is stored, and then the aperture value, the shutter time or the like is controlled by the stored value. On the other hand, in the automatic exposure control by the TTL stop-down metering system, where the aperture is to be controlled, the brightness varying as the aperture is stopped down from the open diameter to the small aperture diameter is measured in real time and when it has become a predetermined amount, the stop-down is restrained and the metering value after the restraining of the stop is stored, and control of the shutter time is effected on the basis of the stored value. As compared with the former, the latter is preferable because, during automatic exposure, the storage is effected after the aperture has been determined and any error in the aperture diameter of the lens is automatically corrected by the shutter time and accordingly, a proper exposure is always obtained.

In the dynamic range of automatic exposure control relative to a variation in the brightness of the light from an object to be photographed, there are limits resulting from two factors. A first factor is the presence of a limit in the aperture value control range or the shutter time control range of the camera, namely, a limit in exposure control. A second factor is the presence of a limit in the dynamic range of a light-receiving element such as a silicon photodiode or cadmium sulfide used in the metering circuit and in the dynamic range of a logarithmic converting circuit which deals with the output of the light-receiving element. This limit by the dynamic range, particularly, the limit on the low brightness side of the brightness of the light from the object passed through the stop, is attributable to the aggravation of the SN ratio which in turn, chiefly in the light-receiving element, is attributable to the dark current and the dark resistance, and to the aggravation of the SN ratio which in turn, on the circuit side, is attributable to the finite input impedance and the stray current such as leak current or the like.

Also, on the high brightness side, a limit of the dynamic range arises from the deviation from the expected rectilinearity which is attributable to the fact that the serial resistance components in the light-receiving element and the output impedances of the circuits used on the circuit side are finite.

Accordingly, the range which can be followed up in automatic exposure control must not exceed the limits resulting from the first and second factors.

However, in a camera of the type in which exposure display is accomplished by open metering and exposure control is accomplished by stop-down metering, there arises the disadvantage that even if, during exposure display, the limit resulting from the second factor is not exceeded and no warning is effected, when exposure control is carried out in such state, stop-down takes place to decrease the light incident on the light-receiving element and the limit resulting from the second factor is exceeded to permit inaccurate exposure control to take place.

SUMMARY OF THE INVENTION

It is an object of the present invention to provide a camera having a device which forecasts the brightness of the light received by the light-receiving element when stopped down by open metering before exposure control and generates low brightness warning when that brightness is lower than the minimum brightness which can be measured by the light-receiving element.

To achieve the above object, the present invention provides a camera provided with metering means having a first metering mode in which, prior to exposure control, the object light passed through a stop of open diameter is metered to produce a first metering output and a second metering mode in which, for exposure control, subsequently to the first metering mode, the object light passed through the stopped down stop is metered to produce a second metering output, aperture control means for controlling the aperture diameter with any one of the aperture value by manual setting, the aperture value corresponding to the shutter time by manual setting and the aperture value corresponding to the first metering output as the controlled value, shutter time control means for controlling the shutter time in accordance with the second metering output, means for producing an exposure information output corresponding to the aperture value controlled by the aperture control means, means for discriminating, prior to the aperture control, the low brightness limit during the second metering mode in accordance with the exposure information output and the low brightness limit relative to the light passed through the stop for which the metering means operates normally, and means for warning about the low brightness in response to the discriminating means.

Hereinafter, the aperture value, shutter time value, film speed, object brightness and exposure amount will be shown in the apex system.

The case of the aperture priority AE mode: The aperture control means controls the aperture diameter with the preset aperture value $A_{VM}$ manually set by the preset aperture ring of the lens being as the controlled value (this is accomplished by a conventional preset aperture mechanism), and the shutter time control means controls the shutter time $T_{VAM}$ in accordance with the second metering output after completion of the aperture control. On the other hand, the exposure information producing means produces from the preset aperture value and the first metering output the difference $B_V - A_{VM}$ between the object brightness and the preset aperture value which is an exposure information output or the shutter time $T_{VAM}$ (at this time, film speed $S_V$ is introduced as required), and the discriminating means suitably compares this exposure information output with a constant corresponding to the low brightness limit and discriminates the low brightness limit during the second metering mode.

The case of the shutter priority AE mode: The aperture control means compares an output corresponding to the shutter time $T_{VM}$ by manual setting with the second metering output during stop-down and, when these two outputs assume a predetermined relation, the aperture control means electromagnetically prevents the stop-down and controls the aperture diameter to the controlled value $A_{VS}$. However, when said predetermined relation exceeds the open aperture diameter or the minimum aperture diameter, the aperture control is completed at a point of time whereat the aperture diameter is a minimum aperture value $A_{VO}$ or a maximum aperture value $A_{VM}$. The shutter time control means controls the shutter time in accordance with the second metering output after completion of the aperture control, and that which is controlled by the aperture control means effects the shutter priority AE with the shutter time as $T_{VM}$ when the aperture value is $A_{VS}$, and effects the aperture priority AE with the shutter time as $T_{VAO}$ corresponding to the minimum aperture value $A_{VO}$ or with the shutter time as $T_{VAM}$ corresponding to the maximum aperture value $A_{VM}$ when the aperture value is $A_{VO}$ or $A_{VM}$ and modifies the shutter time from the manually set value $T_{VM}$ by an amount over which the controlled value $A_{VS}$ exceeds the aperture control range. On the other hand, the exposure information producing means produces an exposure information output $T_{VM}$, $T_{VAO}$ or $T_{VAM}$ corresponding to the aperture value $A_{VS}$, $A_{VO}$ or $A_{VM}$ controlled by the aperture control means (at this time, film speed $S_V$ is introduced as required), and the discriminating means suitably compares this exposure information output with a constant and discriminates the low brightness limit during the second metering mode.

The case of the program AE mode: The aperture control means compares an output corresponding to a program shutter time $T_{VP}$ obtained by the first metering output and two predetermined constants for program AE with the second metering output during stop-down and, when these two outputs assume a predetermined relation, the aperture control means electromagnetically prevents the stop-down and controls the aperture diameter to the controlled value $A_{VP}$. However, there is a limit in the aperture control range, as previously described, and therefore, if this range is exceeded, the aperture value is limited to $A_{VO}$ or $A_{VM}$. The shutter time control means makes the shutter time into $T_{VP}$ when the controlled aperture value is $A_{VP}$, and makes the shutter time into $T_{VAO}$ or $T_{VAM}$ when the aperture value is $A_{VO}$ or $A_{VM}$. On the other hand, the exposure information producing means produces an exposure information output $T_{VP}$, $T_{VAO}$ or $T_{VAM}$ corresponding to the aperture value $A_{VP}$, $A_{VO}$ or $A_{VM}$ controlled by the aperture control means (at this time, film speed $S_V$ is introduced as required), and the discriminating means suitably compares this exposure information output with a constant α and discriminates the low brightness limit during the second metering mode.

The above-described camera may be provided with one of the aperture priority AE mode and the shutter priority AE mode or two or more modes.

The invention will become more fully apparent from the following detailed description thereof taken in conjunction with the accompanying drawings.

DESCRIPTION OF THE PREFERRED EMBODIMENTS

Some embodiments of the present invention will hereinafter be described.

Figure 1:
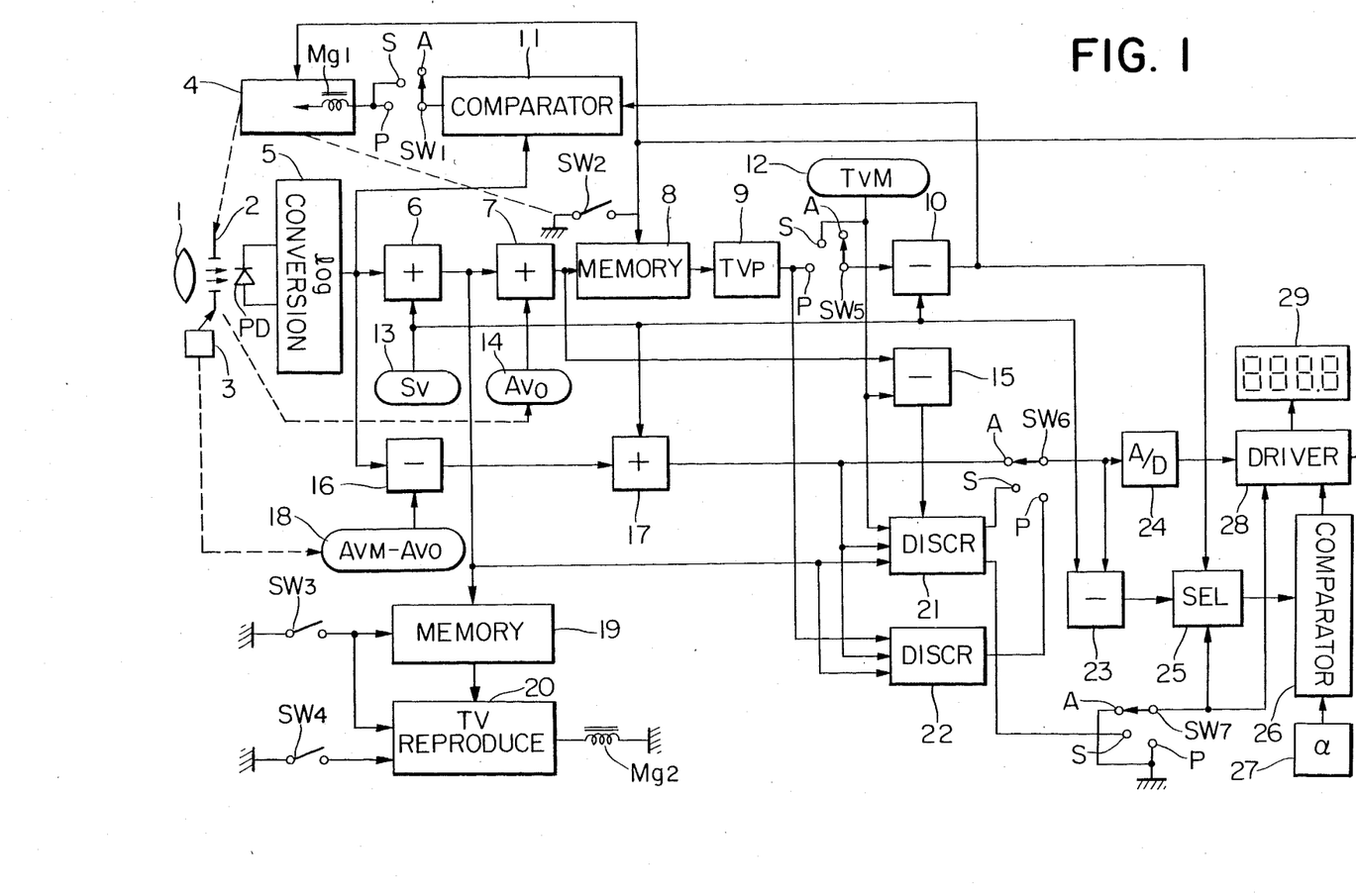
FIG. 1 shows a first embodiment of the present invention.

FIG. 1 shows a first embodiment of the present invention which is an example in which the warning device of the present invention is applied to the exposure control circuit of a TTL stop-down metering single lens reflex camera.

The circuit of this embodiment controls the exposure in the aperture priority AE mode, the shutter priority AE mode and the program AE mode. The modes may be changed over by change-over switches SW1, SW5, SW6 and SW7. These switches are operatively associated with a photographing mode change-over member, not shown. The change-over switches SW1, SW5, SW6 and SW7 are closed with respect to terminals A, S and P, respectively, when the aperture priority AE mode, the shutter priority AE mode and the program AE mode are selected. The switches SW1, SW5, SW6 and SW7 need not always be mechanical switches, but may of course be electrical switches and this is more preferable.

The object light passes through a picture-taking lens 1 and a stop 2 to a photodiode PD which is a light-receiving element. The stop 2 is normally maintained open.

A preset aperture ring 3 controls the aperture diameter when the stop 2 is controlled, and it is set to any aperture diameter when the automatic exposure control by the aperture priority is effected and it is set to the minimum aperture position when the automatic exposure control by the program or the shutter priority is effected. The photodiode PD is disposed at an optical position whereat there is obtained illumination correlated with the illumination imparted to the film surface by the light passed through the lens 1 and below the stop. An aperture control mechanism 4 normally maintains the stop in its open position to make the finder easy to see, and causes stop-down of the stop 2 to be started upon operation of a release button, not shown, and in the aperture priority AE mode, it restrains the stop at the aperture value by the preset aperture ring 3 and in the program or the shutter priority AE mode, it restrains the stop at a position whereat power is supplied to a stop restraining magnet $Mg_1$ included in the aperture control mechanism 4. When exposure control is completed, the aperture control mechnaism 4 again effects the control of maintaining the stop 2 open.

A logarithmic converting circuit 5 converts a photocurrent generated by the photodiode PD into a logarithmically compressed voltage. The logarithmic converting circuit 5 produces an output corresponding to $$B_V - A_V \tag{1}$$

where $B_V$ is the object brightness expressed in apex indication and $A_V$ is the aperture value of the stop 2 expressed in apex indication.

An apex value adding circuit 6 adds the output of a film speed value setting circuit 13 and the output of the logarithmic converting circuit 5 and puts out the same.

The film speed value setting circuit 13 produces an output corresponding to the apex value $S_V$ of the film speed value incorporated in the camera in a known manner.

Accordingly, the apex value adding circuit 6 produces an output corresponding to $$B_V - A_V + S_V \quad (2). \text{ PS}$$

An apex value adding circuit 7 adds the output of the adding circuit 6 and the output of a stop opening setting circuit 14 and puts out the same.

The stop opening setting circuit 14 is automatically set in a known manner in accordance with the aperture open value of the lens mounted to the camera.

In the metering condition for display, the stop 2 is set to its open value and therefore, if the then aperture value is $A_{VO}$, $A_V = A_{VO}$ in (1) and thus, (2) naturally becomes $(B_V - A_{VO} + S_V)$ and accordingly, the output of the adding circuit 7 corresponds to $$B_V + S_V = E_V \quad (3)$$

An open memory circuit 8 stores the output of the adding circuit 7 when an open memory switch SW2 is closed. The open memory switch SW2 is closed as soon as or immediately before the camera is released and the aperture control mechanism 4 starts to control the stop-down of the stop 2. This condition is maintained until exposure control is completed.

A program shutter time forming circuit 9 produces an output in which the value of the output $E_V$ of the open memory circuit 8 indicated by equation (3) is multiplied by 1 or smaller proportion constant and a constant term is added thereto so that a predetermined suitable program line may be provided. Accordingly, if the proportion constant is $\gamma$ and the constant term is $\delta$, the output of the program shutter time forming circuit 9 corresponds to $$\gamma E_V + \delta = T_{Vp} \quad (4).$$

The $T_{VP}$ in equation (4) is the apex value of the shutter time signal when exposure control is effected along the program diagram in the program AE mode, that is, during the program AE including the shutter time outside the area in which both of the aperture value and the shutter time vary corresponding to a variation in the object brightness $B_V$ to thereby enable follow-up of the automatic exposure.

In the shutter priority AE mode, a shutter time setting circuit 12 produces an output corresponding to the apex value $T_{VM}$ of the shutter time set in association with the shutter dial of the camera, not shown.

An apex value subtracting circuit 10 puts out a value obtained by subtracting the output $S_V$ of the film speed setting circuit 13 from the apex value $T_{VM}$ or $T_{VP}$ selected by the mode selecting switch SW5. Accordingly, the output of the subtracting circuit 10 corresponds to $$T_{VM} - S_V \quad (5)$$

or $$T_{VP} - S_V \quad (6).$$

When the camera selects the aperture priority mode, that is, when the mode selecting switch SW5 selects the terminal A, the output of the subtracting circuit 10 exhibits no action as will be described later and therefore, it is shown unconnected.

A comparator circuit 11 for aperture control compares the output of the logarithmic converting circuit 5 shown in (1) with the output of the subtracting circuit 10 shown in (5) or (6) and puts out a signal for supplying power to the aforementioned stop restraining magnet $Mg_1$ to restrain the stop in the area of $$B_V - A_V \leqq T_{VM} - S_V$$

or $$B_V - A_V \leqq T_{VP} - S_V.$$

The output of an apex value subtracting circuit 15 corresponds to a value obtained by subtracting the output $T_{VM}$ of the shutter time setting circuit 12 from the output of the adding circuit 7 during the aperture opening shown in equation (3), namely, $$E_V - T_{VM} = A_{VS} \quad (7).$$

In equation (7), $A_{VS}$ is a value corresponding to the apex value of the aperture value controlled as much as possible to a proper exposure in accordance with the output $T_{VM}$ of the shutter time setting circuit 12 in the shutter priority AE mode, and it is put out for display.

An apex value subtracting circuit 16 puts out a value obtained by subtracting the output of a preset aperture setting circuit 18 from the output of the logarithmic converting circuit shown in (1). The preset aperture setting circuit 18 is set by and in association with the preset aperture ring 3 and puts out the difference between the aperx value $A_{VM}$ of the aperture set value by the preset aperture ring 3 and the open aperture value $A_{VO}$ of the lens, namely, $(A_{VM} - A_{VO})$. Accordingly, in the open condition of the stop 2, the output of the subtracting circuit 16 corresponds to $$B_V - A_{VM} \quad (8).$$

The output of an apex value adding circuit 17 corresponds to a value obtained by adding the output of the subtracting circuit 16 shown in (8) to the output $S_V$ of the film speed setting circuit 13, namely, $$B_V - A_{VM} + S_V = T_{VAM} \quad (9)$$

in the open condition of the stop 2.

The $T_{VAM}$ in equation (9) indicates the control value of the shutter time during the aperture priority AE mode and it is used for display.

A stop-down memory circuit 19 stops down the output of the adding circuit 6 and stores it therein when a memory switch SW3 is closed. The stop-down memory switch SW3 is closed when the aperture control mechanism 4 completes its control stroke for the stop 2, and thereafter, the optical path is changed over to a film exposure system by a reflecting mirror for directing light to the known finder system being moved upwardly. Thereafter, the stop-down memory switch SW3 is maintained closed until exposure is completed, whereupon the reflecting mirror is returned to its initial position and the switch SW3 is opened to release the memory operation of the stop-down memory circuit.

Designated by 20 is a shutter time reproducing circuit.

The value stored by the stop-down memory circuit 19 is the value shown in (2), namely, $$B_V - A_V + S_V = T_V \qquad (10).$$

The $T_V$ value shown in equation (10) means the $T_V$ value for satisfying a proper exposure, and it is converted into a real time by a shutter control magnet $Mg_2$ being controlled by the shutter time reproducing circuit 20, whereby control of the shutter time is effected.

When the stop-down memory switch SW3 is closed, it is transmitted to the shutter time reproducing circuit 20 and power is supplied to the shutter control magnet $Mg_2$, which thus holds the rearward shutter curtain, and when the reflecting mirror is completely changed over to the film exposure system, movement of the forward shutter curtain is started to open the shutter and close a trigger switch SW4 at a suitable timing. By the trigger switch SW4 being closed, counting of the shutter time is started and when the counting is effected up to the shutter time corresponding to the $T_V$ value of the proper exposure stored in the memory circuit 19, the power supply to the shutter control magnet $Mg_2$ is stopped to liberate the rearward shutter curtain and close the shutter, whereby the $T_V$ value stored in the memory circuit 19 is converted into a real time and shutter control which satisfies the proper exposure is effected.

A signal discrimination selecting circuit 21, as will be described later, receives the output of the adding circuit 6 during the opening of the stop, namely, the value when $A_V = A_{VO}$ in (2), and it discriminates the magnitude relation among the output $(B_V - A_{VO} + S_V) = T_{VAO}$ is the $T_V$ value which satisfies the proper exposure in the aperture opening diameter, the output $T_{VM}$ of the shutter time setting circuit 12 and the output $(B_V - A_{VM} + S_V) = T_{VAM}$ of the adding circuit 17 during the opening of the stop. In accordance with the result of said discrimination, the signal discrimination selecting circuit 21 puts out any selected one of the output $A_{VS}$ of the subtracting circuit and the aforementioned outputs $T_{VAO}$ and $T_{VAM}$ to the terminal S of the mode change-over switch SW6. Also, the signal discrimination selecting circuit 21 produces $A_{VS}$ selection signal at the terminal S of the mode change-over switch SW7 when the output $A_{VS}$ of the subtracting circuit 15 is selected.

A signal discrimination selecting circuit 22 discriminates the magnitude relation among the output $T_{VP}$ of the program shutter time forming circuit 9 shown in equation (4) and the outputs $T_{VAO}$ and $T_{VAM}$ of the adding circuits 6 and 17 and in accordance with the result of said discrimination, any selected one of $T_{VP}$, $T_{VAO}$ and $T_{VAM}$ is put out to the terminal P of the mode change-over switch SW6.

An apex value subtracting circuit 23 puts out a value obtained by subtracting the output $S_V$ of the film speed setting circuit 13 from the value selected by the mode change-over switch SW6. An analog-digital converter circuit 24 effects digital display.

A signal selecting circuit 25 selects the output of the subtracting circuit 23 or the output of the subtracting circuit 10 by a change-over signal transmitted through the mode change-over switch SW7 and puts out the same. The signal selecting circuit 25 selects and puts out the output of the subtracting circuit 23 when the mode change-over switch SW7 selects the terminal A or P; the signal selecting circuit 25 selects and puts the output of the subtracting circuit 10 when the mode change-over switch SW7 selects the terminal S and the signal discrimination selecting circuit 21 is putting out the aforementioned $A_{VS}$ selection signal; and the signal selecting circuit 25 selects and puts out the output of the subtracting circuit 23 when the mode change-over switch SW7 selects the terminal S but the signal discrimination selecting circuit 21 is not putting out the $A_{VS}$ selection signal.

A comparator circuit 26 compares the output of the signal selecting circuit 25 with the apex value of a metering limit value circuit 27 and, when the output of the signal selecting circuit 25 is smaller than the output of the metering limit value circuit 27, the comparator circuit 26 puts out a low brightness warning signal to a display driving circuit 28. The display driving circuit 28 drives a segment indicator 29 such as LCD or LED.

The display driving circuit 28 effects the decoding for the indicator 29 to carry out a well-known aperture value display such as "F5.6" when the $A_{VS}$ selection signal transmitted through the mode change-over switch SW7 is applied as input thereto, and effects the decoding for the indicator 29 to carry out a shutter time value display such as "125" when the $A_{VS}$ selection signal is not applied as input thereto. When shutter release is effected, the aforementioned open memory switch SW2 is closed and refreshing of the display is effected at a period of the order of 2–4 Hz to latch the display condition as long as the switch SW2 is closed and to refresh the display condition when the switch SW2 is opened. Also, the display driving circuit 28 has a circuit for effecting, for example, warning displays "LO" and "HI" when the limit due to the aforementioned first factor, namely, the limit of exposure control, specifically, the long time limit and high-speed time limit of the shutter time, are exceeded, and when the comparator circuit 26 is putting out a low brightness warning signal, the display driving circuit 28 effects the warning display "LO" even if the area of long time limit warning is not reached.

The photodiode PD and the logarithmic converting circuit 5 together constitute the metering means of the present invention. The apex value subtracting circuit 16, the preset aperture setting circuit 18, the shutter time setting circuit 12, the apex value subtracting circuit 10, the aperture controlling comparator circuit 11 and the aperture control mechanism 4 together constitute the aperture control means of the present invention. The shutter time reproducing circuit 20 and the memory circuit 19 together constitute the shutter time control means of the present invention. The signal selecting circuit 25 constitutes means for producing an exposure information output. The comparator circuit 26 and the metering limit value circuit 27 together constitute discriminating means. The display circuit 29 and the driving circuit 28 together constitute means for giving warning of low brightness.

Operation of the embodiment of FIG. 1 will be described hereinafter.

(a) Operation in the case of the aperture priority AE mode:

The mode change-over switches SW1, SW5, SW6 and SW7 select the terminal A. Exposure control is carried out in the following manner.

Since the mode change-over switch SW1 selects the terminal A, the stop restraining magnet $Mg_1$ of the aperture control mechanism 4 is not operated. Accordingly, whenever the camera is released, the stop 2 is stopped down to the aperture value by the preset aperture ring 3.

If the aperture value by the preset aperture ring is $A_{VM}$, at the point of time whereat the stop-down of the lens has been completed, the output of the adding circuit 6 is $A_V=A_{VM}$ and therefore, $B_V-A_{VM}+S_V=T_{VAM}$ and, at the point of time whereat the stop-down has been completed, the memory switch SW3 is closed and $T_{VAM}$ is stored in the stop-down memory circuit 19, and as previously described, the shutter control magnet $Mg_2$ is controlled by the shutter time reproducing circuit 20, whereby proper exposure is effected.

Here, the limit due to the aforementioned second factor will be described in detail.

The $(B_V-A_V)$ shown in (1) is a value correlated to the illumination of the photodiode PD and if this value becomes smaller, that is, if the brightness becomes lower, the metering value becomes incorrect due to the aforementioned factor. Accordingly, if a value indicating the limit which can ensure normal treatment of $(B_V-A_V)$ is $\alpha$, a correct metering value is obtained in an area which satisfies $$B_V-A_V \geq \alpha \tag{11}$$

Thus, in the case of the aperture priority AE mode, it may be discriminated whether $$B_V-A_{VM} \geq \alpha \tag{12}$$

is satisfied or not. Now, in the case of the aperture priority AE mode, the shutter time is an element to be controlled and therefore, display is carried out in the form of shutter time, namely, $T_{VAM}$. That is, $$T_{VAM}=B_V-A_{VM}+S_V$$

and hence, formula (12) becomes $$T_{VAM} \geq \alpha+S_V \tag{13}$$

or $$T_{VAM}-S_V \geq \alpha \tag{14}$$

and thus, it may be discriminated whether formula (13) or (14) is satisfied or not. In the embodiment of FIG. 1, warning display is carried out in the discrimination method of formula (14). The display operation in the aperture priority AE mode will be described hereinafter.

As previously described, the output $T_{VAM}$ of the adding circuit 17 is transmitted to the analog-digital converter circuit 24 and the subtracting circuit 23 through the mode change-over switch SW6. Accordingly, the output of the subtracting circuit 23 is $$T_{VAM}-S_V \tag{15}$$

Since, in the aperture priority AE mode, the signal selecting circuit 25 selects the output of the subtracting circuit 23 as previously described, the output of the subtracting circuit 23 corresponding to (15) is applied as input to the comparator circuit 26.

On the other hand, the comparator circuit 26 has applied thereto the output of the metering limit value circuit 27 as the comparison reference. The metering limit value circuit 27 puts out the $\alpha$ in formula (11). Accordingly, in the area of $$T_{VAM}-S_V \geq \alpha,$$

the comparator circuit 26 does not put out a low brightness warning signal and therefore, the shutter time display of $T_{VAM}$ is effected by the display driving circuit on the basis of the digital output of the analog-digital converter circuit 24. Even if $T_{VAM}-S_V \geq \alpha$ is satisfied, the display driving circuit 28 discriminates whether $T_{VAM}$ is between the high-speed limit value $T_{VMAX}$ and the low-speed limit value $T_{VMIN}$ which are determined by the mechanical factor of the shutter mechanism of the camera and the electrical factor of the shutter time reproducing circuit, and effects the display of $T_{VAM}$ when $T_{VMIN} \leq T_{VAM} \leq T_{VMAX}$, effects the display of "LO" when $T_{VAM} < T_{VMIN}$ and effects the display of "HI" when $T_{VAM} > T_{VMAX}$.

When $T_{VAM}-S_V-\alpha$, the comparator circuit 26 puts out a low brightness warning signal and at that time, the display of "LO" is forcibly effected even in the area of $T_{VMIN} \leq T_{VAM} \leq T_{VMAX}$.

That is, when $T_{VAM}$ becomes smaller than any greater one of $T_{VMIN}$ and $(\alpha+S_V)$, warning display of "LO" is effected, whereby it is warned that the exposure is outside the guaranteed range of proper exposure.

If the film speed becomes higher as shown in formulas (13) and (14), the limit of $T_{VAM}$ correspondingly moves toward the high speed side.

(b) Operation in the case of the shutter priority AE mode:

The mode change-over switches SW1, SW5, SW6 and SW7 select the terminal S. Exposure control is carried out in the following manner.

The present aperture ring 3 need not always be set to a maximum aperture value, but is normally set to the maximum aperture value to widen the area in which the aperture is automatically controlled. The change-over switch SW5 selects the terminal S and therefore, the output of the subtracting circuit 10 is $(T_{VM}-S_V)$. When the camera is released, the open memory switch SW2 is closed by the aperture control mechanism 4 and the stop restraining magnet $Mg_1$ becomes ready to be supplied with power, and the stop starts stop-down.

The comparator circuit 11 puts out a power supply signal to the stop restraining magnet $Mg_1$ through the terminal S of the mode change-over switch SW1 to restrain the stop when the output $(B_V-A_V)$ of the logarithmic converting circuit 5 becomes smaller than or equal to the output $(T_{VM}-S_V)$ of the subtracting circuit 10. The then stop restraining operation is divided into three states. A first state is that when the relation that $B_V-A_{VO} \leq T_{VM}-S_V$ has already been reached before the camera is released. $A_{VO}$ is the open aperture value of the lens. This state means that at the shutter time $T_{VM}$ designated by the shutter time setting circuit 12, a proper exposure cannot be obtained in the controllable aperture value range between $A_{VO}$ to $A_{VM}$ due to $A_{VO}$ being too great relative to $B_V$ or $B_V$ being too small relative to $A_{VO}$. In this state, the comparator circuit 11 produces a stop restraining signal as soon as the camera is released and the open memory switch SW2 is closed, and therefore power is supplied to the stop restraining magnet $Mg_1$, whereby the stop is restrained with an open diameter $A_{VO}$.

A second state is that when $B_V-A_{VO} \leq T_{VM}-S_V \leq B_V-A_{VM}$, where $A_{VM}$ is the maximum aperture value by the preset aperture ring 3. This state means that at the shutter time $T_{VM}$ designated by the shutter time setting circuit 12, aperture control is effected with an aperture value between $A_{VO}$ to $A_{VM}$ and a proper exposure is obtained. In this state, when the camera is released, stop-down takes place and, when the relation that $(B_V-A_V)=(T_{VM}-S_V)$ is reached, the comparator circuit 11 puts out a stop restraining signal to restrain the stop. If the then aperture value is $A_{VS}$, $A_{VS}$ has the following relations:

$$A_{VS}=B_V+S_V-T_{VM}$$

and $$A_{VO}<A_{VS}<A_{VM}.$$

A third state is that when $B_V-A_{VM}\geqq T_{VM}-SV$. This state means that at the shutter time $T_{VM}$ designated by the shutter time setting circuit 12, a proper exposure cannot be obtained in the controllable aperture value range between $A_{VO}$ to $A_{VM}$ due to $A_{VM}$ being too small relative to $B_V$ or $B_V$ being too great relative to $A_{VM}$. In this state, when the camera is released and stop-down takes place, the stop is stopped down up to $A_{VM}$ by the present aperture ring 3 and thus, control of the aperture value is not effected electrically.

When the aperture control stroke belonging to any one of the first, second and third states is completed, the output of the adding circuit 6 after the stop-down is stored as described with respect to the aperture priority AE mode and the shutter control which always keeps the relation of proper exposure is effected.

The shutter time $T_{VS1}$ controlled in the first state is $$T_{VS1}=B_V-A_{VO}+S_V=T_{VAO},$$

the shutter time $T_{VS2}$ controlled in the second state is $$T_{VS2}=B_V-A_{VS}+S_V$$

and if it is assumed that $A_{VS}$ is the aperture value controlled between $A_{VO}$ to $A_{VM}$ during the shutter priority mode, $$A_{VS}=B_V+S_V-T_{VM}$$

and hence, $$T_{VS2}=T_{VM}.$$

In the third state, the shutter time $T_{VS3}$ controlled is $$V_{VS3}=B_V-A_{VM}+S_V=T_{VAM}$$

and even outside the aperture control range, the shutter time is always corrected to satisfy a proper exposure.

Display operation will be described hereinafter.

Before the camera is released, the output of the adding circuit is the shutter time $T_{VAO}$ for which the proper exposure during the opening of the stop is obtained, as previously described, and the output of the adding circuit 17 is the shutter time $T_{VAM}$ for which the proper exposure when the stop has been stopped down to the minimum aperture by the preset aperture ring 3 is obtained. Accordingly, in which of the aforedescribed first to third states the exposure control is effected can be discriminated by discriminating the magnitude relation among $T_{VAO}$, $T_{VM}$ and $T_{VAN}$.

That is, the stop restraining operation belongs to the first state when $T_{VAO}\leqq T_{VM}$ is discriminated, belongs to the second state when $T_{VAM}<T_{VM}<T_{VAO}$ is discriminated, and belongs to the third state when $T_{VM}\leqq T_{VAN}$ is discriminated, and such discrimination is accomplished by the signal discrimination selecting circuit 21. When the signal discrimination selecting circuit 21 detects the first state, the output $T_{VAO}$ of the adding circuit 6 is put out to the terminal S of the mode change-over switch SW6 and the $A_{VS}$ selection signal is not put out to the terminal S of the mode change-over switch SW7.

Accordingly, the display driving circuit 28 decodes the digital output $T_{VAO}$ of the analog-digital converter circuit 24 for the purpose of shutter time display and the $T_{VAO}$ shutter time is displayed by the segment indicator 29.

When the signal discrimination selecting circuit 21 detects the second state, the output $A_{VS}$ of the subtracting circuit 15 (the controlled aperture value in the range in which the proper exposure is followed up by the aperture value control) is put out to the terminal S of the mode change-over switch SW6 and the $A_{VS}$ selection signal is put out to the terminal S of the mode change-over switch SW7.

Accordingly, the display driving circuit 28 decodes the digital output $A_{VS}$ of the analog-digital converter circuit 24 for the purpose of aperture value display and the $A_{VS}$ aperture value is displayed by the segment indicator 29.

When the signal discrimination selecting circuit 21 detects the third state, the output $T_{VAM}$ of the adding circuit 17 is put out to the terminal S of the mode change-over switch SW6 and the $A_{VS}$ selection signal is not put out to the terminal S of the mode change-over switch SW7.

Accordingly, the display driving circuit 28 decodes the digital output $T_{VAM}$ of the A/D converter circuit 24 for the purpose of shutter time display and the $T_{VAM}$ shutter time is displayed by the segment indicator 29.

The low brightness warning is effected in the following manner.

The second state is an area controlled so that the illumination of the surface of the light-receiving element which is the photodiode PD is a predetermined illumination determined by $(T_{VM}-S_V)$ when exposure control is effected.

This is because the aperture value $A_V$ is controlled so that the relation that $$B_V-A_V=T_{VM}-S_V$$

is established when exposure control is effected. Since $(B_V-A_V)$ means the illumination of the surface of the light-receiving element as previously described, it is determined by the value of $(T_{VM}-S_V)$ in the same manner as previously described. Accordingly, whether the relation of formula (11) is established or not can be discriminated by discriminating $$T_{VM}-S_V\geqq\alpha.$$

In the second state, as previously described, the $A_{VS}$ selection signal is transmitted to the signal selecting circuit 25 by the signal discrimination selecting circuit 21 through the terminal S of the mode change-over switch SW7 and therefore, the signal selecting circuit 25 selects the output $(T_{VM}-S_V)$ of the subtracting circuit 10, and this output is applied as input to the comparator circuit 26, whereby $(T_{VM}-S_V)\geqq\alpha$ is discriminated. When $(T_{VM}-S_V)<\alpha$, a low brightness warning signal is put out and the display driving circuit 28 effects the low brightness warning display "LO".

In the case of the first state, even if the camera selects the shutter priority AE mode, automatic exposure control is carried out substantially in the same manner as when control is carried out in the aperture priority AE mode when the preset aperture ring 3 is set to the open aperture $A_{VO}$.

This state means that the illumination of the photodiode PD is smaller than the illumination determined by $(T_{VM}-S_V)$ in the second state and therefore, sometimes, formula (11) is not satisfied even if $T_{VM}-S_V \geq \alpha$ is satisfied.

Accordingly, at this time, discrimination of $(T_{VM}-S_V) \geq \alpha$ is not effected and the signal discrimination selecting circuit 21 puts out $T_{VAO}$ to the terminal S of the mode change-over switch SW6 and does not put out the $A_{VS}$ selection signal to the terminal S of the mode change-over switch SW7 and therefore, the signal selecting circuit 25 selects the output of the subtracting circuit 23 and thus, the output $(T_{VAO}-S_V)$ of the subtracting circuit 23 is applied as input to the comparator circuit 26 to effect discrimination of $$T_{VAO}-S_V \geq \alpha.$$

When $T_{VAO}-S_V<\alpha$, the comparator circuit 26 puts out a low brightness warning signal and therefore, warning display is carried out in the same manner as previously described.

In the case of the third state, as in the first state, substantially the same control as that in the aperture priority AE mode when the preset aperture ring 3 is set to any other position than $A_{VO}$ is carried out. In this state, the illumination of the photodiode PD is greater than the illumination determined by $(T_{VM}-S_V)$ in the second state and therefore, sometimes, $B_V-A_V \geq \alpha$ is established even if $T_{VM}-S_V \geq \alpha$ is not satisfied.

Accordingly, as in the case of the first state, discrimination of $T_{VM}-S_V \geq \alpha$ is not effected and the signal discrimination selecting circuit 21 puts out $T_{VAM}$ to the terminal S of the mode change-over switch SW6 and does not put out the $A_{VS}$ selection signal to the terminal S of the mode change-over switch SW7 and therefore, the signal selecting circuit 25 selects the output of the subtracting circuit 23 and thus, the output $(T_{VAM}-S_V)$ of the subtracting circuit 23 is applied as input to the comparator circuit 26, whereby discrimination of $$T_{VAM}-S_V \geq \alpha$$

is effected.

When $T_{VAM}-S_V<\alpha$, the comparator circuit 26 puts out a low brightness warning signal and thus, warning display is carried out in the same manner as previously described.

(c) The case of the program AE mode:

The mode change-over switches SW1, SW5, SW6 and SW7 select the terminal P. At this time, as in the case of the shutter priority AE mode, the stop is usually set to a maximum aperture value corresponding to the minimum aperture diameter to widen the automatically exposed area.

Since the change-over switch SW5 selects the terminal P, the output of the subtracting circuit 10 is $(T_{VP}-S_V)$, where $T_{VP}$ is $$T_{VP}=\gamma E_V+\delta$$

as shown in equation (4).

When the camera is released, the open memory switch SW2 is closed by the aperture control mechanism 4 and the stop restraining magnet Mg$_1$ becomes ready to be supplied with power, and the stop starts stop-down. By the closing of the open memory switch SW2, the open memory circuit 8 is operated to store the value of the output $$B_V+S_V=E_V$$

of the adding circuit 7 during the opening of the stop.

Accordingly, the output $(T_{VP}-S_V)$ of the subtracting circuit 10 is maintained until exposure is completed. The comparator circuit 11 puts out a power supply signal to the stop restraining magnet Mg$_1$ through the terminal P of the mode change-over switch SW1 to restrain the stop when the output $(B_V-A_V)$ of the logarithmic converting circuit 5 has become smaller than or equal to the output $(T_{VP}-S_V)$ of the subtracting circuit 10. The then stop restraining operation has three states as does the operation during the shutter priority AE mode.

A first state is that when the relation that $B_V-A_{VO} \leq T_{VP}-S_V$ has already been attained before the camera is released. This state means that for an aperture value in the controllable aperture value range between the shutter time $T_{VP}$ and $A_{VO}-A_{VM}$ of the program shutter time forming circuit 9, a proper exposure is not obtained due to $A_{VO}$ being too great relative to $B_V$ or $B_V$ being too small relative to $A_{VO}$. In this state, the comparator circuit 11 produces a stop restraining signal as soon as the camera is released to close the open memory switch SW2 and therefore, power is supplied to the stop restraining magnet Mg$_1$ and thus, the stop is restrained with the open diameter $A_{VO}$.

A second state is that when $B_V-A_{VO}>T_{VP}-S_V>B_V-A_{VM}$. This state means that a proper exposure is effected at the shutter time $T_{VP}$ designated by the program shutter time setting circuit 9 and the aperture value between $A_{VO}$ to $A_{VM}$. In this state, when the camera is released, stop-down takes place and when the relation that $B_V-A_V=T_{VP}-S_V$ is attained, the comparator circuit 11 puts out a stop restraining signal to restrain the stop.

Assuming that the then aperture value is $A_{VP}$, $A_{VP}$ has in the following relations:

$$A_{VP}=B_V+S_V-T_{VP}=(1-\gamma)E_V-\delta,$$

where $\gamma<1$, $$T_{VP}=\gamma E_V+\delta$$

and $$A_{VO}<A_{VP}<A_{VM}.$$

A third state is that when $B_V-A_{VM} \geq T_{VP}-S_V$. This state means that for the shutter time $T_{VP}$ designated by the program shutter time forming circuit 9 and the aperture value between $A_{VO}$ to $A_{VM}$, a proper exposure is not obtained due to $A_{VM}$ being too small relative to $B_V$ or $B_V$ being too great relative to $A_{VM}$. In this state, when the camera is released and stop-down takes place, the stop is stopped down to $A_{VM}$ by the preset aperture ring 3 and therefore, control of the aperture value is not effected electrically.

When an aperture control stroke belonging to any one of the first, second and third states is completed, the output of the adding circuit 6 after the stop-down is stored in the same manner as described with respect to the aperture priority mode and shutter control which always keeps the relation of proper exposure is carried out.

The shutter time $T_{VP1}$ controlled in the first state is $$T_{VP1} = B_V - A_{VO} + S_V = T_{VAO},$$

The shutter time $T_{VP2}$ controlled in the second state is $$T_{VP2} = B_V - A_{VP} + S_V$$

and if it is assumed that $A_{VP}$ is the aforementioned aperture value controlled between the aperture values $A_{VO}$ to $A_{VM}$ during the program AE mode, as described previously, $$A_{VP} = (1-\gamma)E_V - \delta,$$

$$E_V = B_V + S_V,$$

hence, $$T_{VP2} = \gamma E_V + \delta = T_{VP},$$

and the shutter time $T_{VP3}$ controlled in the third state is $$T_{VP3} = B_V - A_{VM} + S_V = T_{VAM}$$

and thus, even outside the aperture control range, the shutter time is always corrected to satisfy a proper exposure.

Description will now be made of the display operation in this case.

Before the camera is released, as previously described, the output of the adding circuit 6 is the shutter time $T_{VAO}$ for which the proper exposure during the opening of the stop is obtained. Also, the output of the adding circuit 17 is the shutter time $T_{VAM}$ for which the proper exposure when the stop is stopped down to the minimum aperture diameter by the present aperture ring 3 is obtained. Accordingly, in which of the first to third states the exposure control is effected can be discriminated by discriminating the magnitude relation among $T_{VAO}$, $T_{VP}$ and $T_{VAM}$.

That is, the display operation belongs to the first state when discrimination of $T_{VAO} \leq T_{VP}$ is effected, belongs to the second state when discrimination of $T_{VAM} < T_{VP} < T_{VAO}$ is effected, and belongs to the third state when discrimination of $T_{VP} \leq T_{VAM}$ is effected, and such discrimination is accomplished by the signal discrimination selecting circuit 22. When the signal discrimination selecting circuit 22 detects the first state, the output $T_{VAO}$ of the adding circuit 6 is put out to the terminal P of the mode change-over switch SW6. Since the mode change-over switch SW7 selects the terminal P, the signal selecting circuit 25 selects the output of the subtracting circuit 23 and the display driving circuit 28 effects display of the shutter time $T_V$ on the basis of the output of the analog-digital converter circuit 24. Accordingly, in the case of the first state, display of $T_{VAO}$ takes place.

When the signal discrimination selecting circuit 22 detects the second state, the output $T_{VP}$ of the program shutter time forming circuit 9 is selected, and when the circuit 22 detects the third state, the output $T_{VAM}$ of the adding circuit 17 is selected and these outputs are put out to the terminal P of the mode change-over switch SW6 and therefore, display of $T_{VP}$ and $T_{VAM}$ is effected by the segment indicator 29 through the analog-digital converter 24 and the display driving circuit 28.

Low brightness warning is carried out in the following manner.

The signal selecting circuit 25 is fixedly selecting the output of the subtracting circuit 23 because the mode change-over switch SW7 selects the terminal P. Accordingly, the output of the subtracting circuit 23 is applied as input to the comparator circuit 26.

In the cases of the aforementioned first and third states, even if the camera is selected to the program AE mode, automatic exposure control is effected substantially in the same manner as when control is effected in the aperture priority AE mode when the preset aperture ring 3 is set to the open aperture $A_{VO}$ or $A_{VM}$.

Thus, discrimination of $$T_{VAO} - S_V \geq \alpha$$

or $$T_{VAM} - S_V \geq \alpha$$

is effected.

When $T_{VAO} - S_V < \alpha$ or $T_{VAM} - S_V < \alpha$, the comparator circuit 26 puts out a low brightness warning signal and therefore, warning display is effected in the same manner as previously described.

In the second state, control of the aperture is effected on the basis of the output $T_{VP}$ of the program shutter time forming circuit 9.

The then $A_{VP}$, as previously mentioned, is $$A_{VP} = (1-\gamma)E_V - \delta$$

and whether formula (11) is satisfied or not can be discriminated by discriminating $B_V - A_{VP} \geq \alpha$.

On the other hand, $$\begin{aligned} B_V - A_{VP} &= B_V - (1-\gamma)E_V + \delta \\ &= \gamma(B_V + S_V) - S_V + \delta \\ &= (\gamma E_V + \delta) - S_V \\ &= T_{VP} - S_V \end{aligned}$$

and therefore, this is the same in effect as the fact that $B_V - A_V \geq \alpha$ of formula (11) is discriminated by discriminating $T_{VP} - S_V \geq \alpha$. In the case of the second state, the output of the subtracting circuit 23 is $(T_{VP} - S_V)$. Accordingly, when $T_{VP} - S_V < \alpha$, the comparator circuit 26 puts out a warning signal and therefore, warning display is effected in the same manner as previously described.

In the first embodiment, the low brightness warning and the warning when the low-speed limit value $T_{VMIN}$ of the shutter is exceeded toward the low-speed side are carried out by the same warning display "LO", but alternatively, one of the warnings may be displayed by flicker or the two warnings may be displayed by discrete character patterns.

Figure 2:
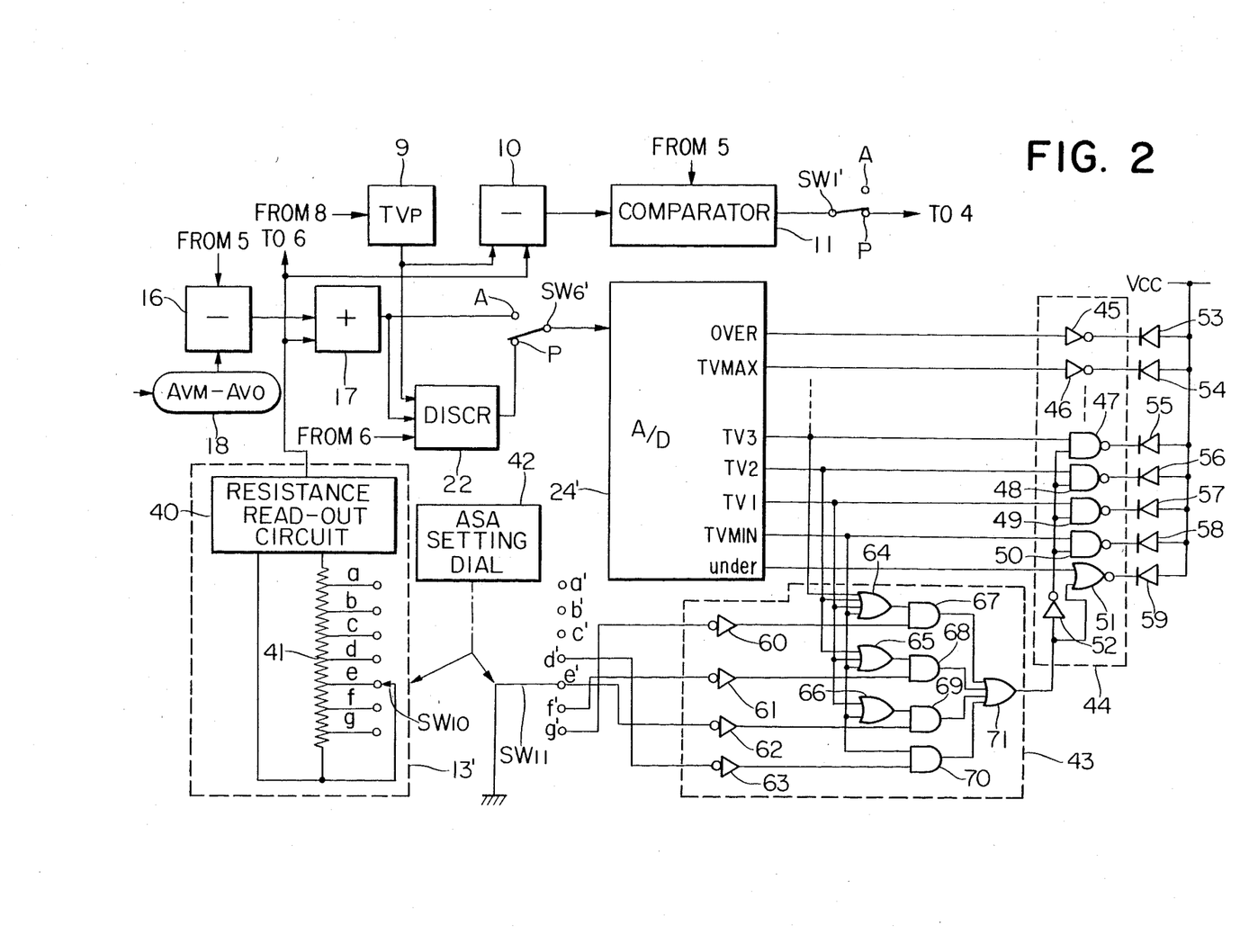
FIG. 2 shows a second embodiment of the present invention.

FIG. 2 shows a second embodiment of the present invention.

In this embodiment, the shutter priority AE mode in FIG. 1 is absent and display is not digital display but is accomplished by the turned-on position of LED being changed over. Also, in this embodiment, discrimination of low brightness warning is not effected by comparing the value obtained by subtracting $S_V$ from the calculated $T_V$ with the low brightness limit value $\alpha$ as in FIG. 1, but low brightness warning display is effected by comparing the value obtained by adding $S_V$ to the low brightness limit value $\alpha$ shown in formula 13 with the controlled $T_V$ value.

In FIG. 2, operational elements similar to those of FIG. 1 are given similar reference numerals and parts which need not be described in particular are omitted. Since the shutter priority AE mode is absent in this embodiment, the shutter time setting circuit 12, the subtracting circuits 15, 23, the signal selecting circuit 25, the mode change-over switches SW5, SW7, and the signal discrimination selecting circuit 21 which are associated with the shutter priority AE mode are eliminated.

Mode change-over switches SW1' and SW6' correspond to the mode change-over switches SW1 and SW6 of FIG. 1 and, since the shutter priority AE mode is absent, terminals S are eliminated.

A film speed value setting circuit 13' corresponds to the one designated by 13 in FIG. 1. The film speed value setting circuit 13' has a change-over switch SW10 operatively associated with an ASA setting dial 42, and changes over the resistance value of a resistor train 41 and converts the film speed $S_V$ into the form of a current or voltage by a resistance value reading circuit 40 and puts out the same to adding circuits 6, 17 and a subtracting circuit 10. A change-over switch SW11 applies the film speed value $S_V$ as input to a comparator circuit 43 to be described. The change-over switch SW11, like a switch SW10, is set by the ASA setting dial 42 and is selected to a' and b' when the switch SW10 is closed at a and b. As will be described later, a', b' and c' are not connected because they are unnecessary. The film speed value $S_V$ is higher in the order of (a,a'), (b,b'), ..., (g,g').

An analog-digital converter circuit 24' corresponds to the one designated by 24 in FIG. 1 and converts an analog $T_V$ value transmitted through a mode change-over switch SW6' into a signal for effecting display of the analog $T_V$ value. The analog-digital converter circuit 24' has output lines OVER, $T_{VMAX}, \ldots, T_{V3}, T_{V2}, T_{V1}, T_{VMIN}$ and UNDER, and any particular output corresponding to the input or only adjacent outputs are selected to put out a high (hereinafter referred to as H) level output. $T_{VMAX}$ and $T_{VMIN}$, as previously described, correspond to the controllable highest speed shutter time and the longest shutter time determined by the mechanical limitations of the shutter time reproducing circuit and the shutter control mechanism. The outputs OVER and UNDER become H level when they exceed the control range thereof, and effect warning display. A display driving circuit 44 corresponds to the display driving circuit 28 of FIG. 1 and has the input of the analog-digital converter circuit 24' and the input of a comparator circuit 43 for low brightness warning. The display driving circuit 44 comprises inverters 45, 46, 52, NAND gates 47, 48, 49, 50 and a NOR gate 51, and all of the omitted parts are inverters. All the outputs of the elements 45-51 are made into constant currents and, when these outputs are low (hereinafter referred to as L), constant currents flow to light-emitting diodes 53-59 corresponding thereto, whereby these light-emitting diodes emit light.

The comparator circuit 43 comprises inverters 60, 61, 62, 63, OR gates 64, 65, 66, 71 and AND gates 67, 68, 69, 70, and has the input by the switch SW11 and inputs corresponding to the outputs $T_{V3}, T_{V2}, T_{V1}$ and $T_{VMIN}$ of the analog-digital converter circuit 24'. The comparison output of the comparator circuit 43 is transmitted to the display driving circuit 44.

The operation of the second embodiment is carried out in the following manner.

Description will first be made of the operation when the aperture priority AE mode is selected.

In this state, the mode change-over switch SW6' is closed at the terminal A. Accordingly, as in FIG. 1, the output $T_{VAM}$ (corresponding to any one of $T_{VMAX} - T_{VMIN}$ or to other OVER or UNDER) of the adding circuit 17 is applied as input to the analog-digital converter circuit 24' and a display output corresponding thereto is put out.

Here, it is to be understood that the change-over switches SW10 and SW11 select any of (a,a'), (b,b') and (c,c').

In that state, all of the outputs of the inverters 60, 61, 62 and 63 and accordingly the outputs of the AND gates 67, 68, 69, 70 and the OR gate 71 are maintained at L level.

In this state, the gates 47-51 operate as mere inverters and therefore, in accordance with the output (OVER, $T_{VMAX}, \ldots, T_{VMIN}$, UNDER) of the analog-digital converter circuit, the turn-on control of the light-emitting diodes 53-59 (one of which is turned on to display that effect) is carried out.

When the change-over switches SW10 and SW11 select the terminal d, d', the AND gate 70 becomes operable and, when the output $T_{VMIN}$ of the analog-digital converter circuit 24' is H, the output of the AND gate 70 becomes H and the output of the OR gate 71 becomes H level and thus, a low brightness warning output is put out. By this output, the output of the inverter 52 becomes L and therefore, the output of the NAND gate 50 is maintained H, so that the light-emitting diode 58 is not turned on, and the output of the NOR gate 51 becomes L, so that the light-emitting diode 59 is turned on. That is, correspondingly to the output of the analog-digital converter circuit, the light-emitting diodes 53-57 are turned on between OVER to $T_{V1}$, but the light-emitting diode 58 corresponding to $T_{VMIN}$ is not turned on and the light-emitting diode 59 is turned on with the turned-on position jumping. Likewise, as the change-over switches SW10 and SW11 select (e,e'), (f,f') and (g,g') in succession, the position at which the display jumps moves to $T_{V1}, T_{V2}$ and $T_{V3}$.

By this operation, low brightness warning is carried out in association with the $S_V$ value input by the change-over switch SW11. The operation in which the gates 67-70 constituting the comparator circuit 43 are selected by the $S_V$ value set by the change-over switch SW11 corresponds to the operation of setting the value of $(\alpha + S_V)$ of formula (13), and the operation in which the output of the selected gate becomes H or L in accordance with the input $T_V$ corresponds to the fact that the $T_{VAM}$ value information transmitted to the comparator circuit 43 by the analog-digital converter circuit 24' is compared, and it means that $T_{VAM} \geqq (\alpha + S_V)$ is discriminated. When the input $T_V$ is $T_{VAM} < (\alpha + S_V)$, the output of the OR gate 71 becomes H and a low brightness warning output is produced and therefore, the light-emitting diode corresponding to the input $T_V$ value is not turned on but the light-emitting diode 59 corresponding to UNDER is always turned on to effect low brightness warning. The value of α is given by where in the $S_V$ value the boundary between the terminals d', e', f', g' of the change-over switch SW11 for transmitting the $S_V$ value information input to the comparator circuit 43 and the unconnected terminals a', b', c' is preset.

Low brightness warning is carried out by the above-described operation.

During the program AE mode, low brightness warning is carried out in a similar manner. The difference of the operation during the program AE mode from that during the aperture priority mode is that as in FIG. 1, any one of $T_{VAO}$, $T_{VAM}$ and $T_{VP}$ input to tha analog-digital converter circuit 24' is selected and the selected $T_V$ is an estimated $T_V$ value for effecting proper exposure control, and the $T_V$ value estimated to be controlled by the same principle as FIG. 1 is monitored, whereby low brightness warning is carried out in a manner similar to the case of the aperture priority mode.

Figure 3:
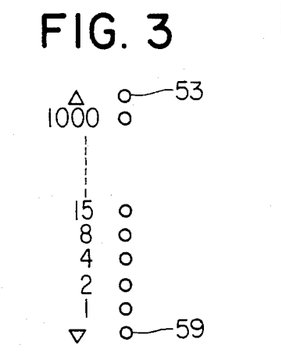
FIG. 3 shows the display within the finder.

FIG. 3 shows an example in which the light-emitting diodes in the embodiment of FIG. 2 are displayed within the finder. Display of OVER is effected by diode 53 and display of UNDER by diode 59.

Figure 4:
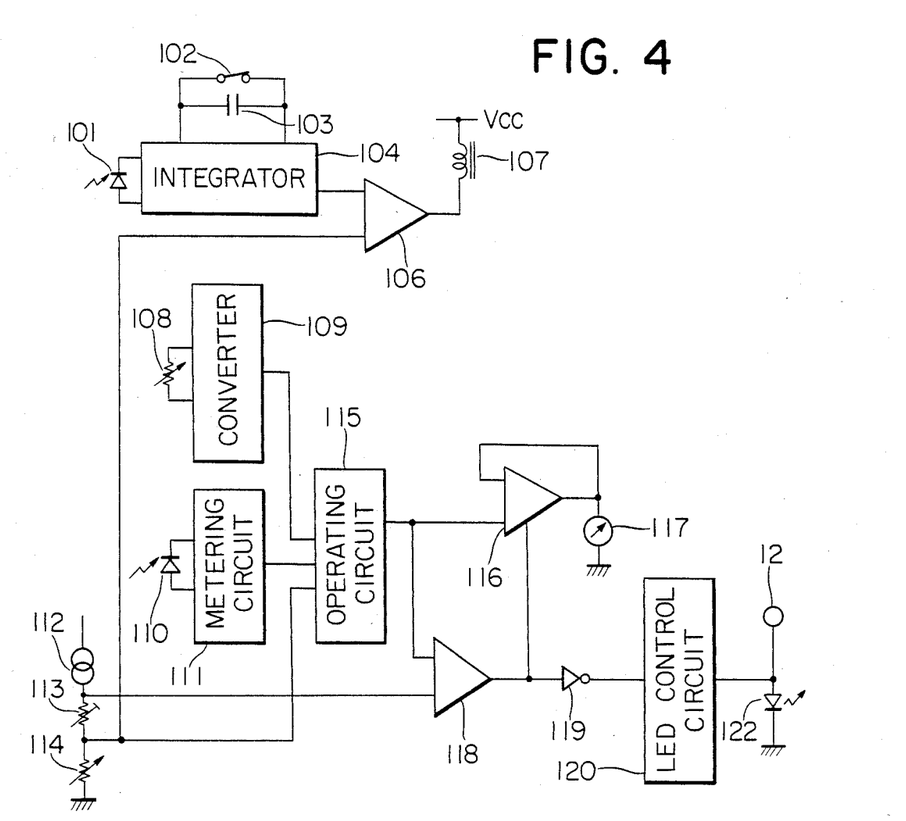
FIG. 4 shows a third embodiment of the present invention.

FIG. 4 shows a third embodiment of the present invention. In this embodiment, operation is effected in the aperture priority AE mode. A light-receiving element 101, a switch 102, a capacitor 103, an integrator 104, a comparator 106 and a rearward shutter curtain restraining magnet 107 operate after the stop is stopped down to a preset aperture value by release operation, meter the light transmitted through the stop and reflected by the shutter curtain surface and/or the film surface and determine the shutter time. Film speed information is applied as input to the comparator 106 from a film speed information resistor 114. An aperture information resistor 108, a voltage converting circuit 109, a light-receiving element 110, a metering circuit 111, a current source 112, variable resistors 113, 114, an operational circuit 115, a meter follower 116, a meter 117, a comparator 118, an inverter 119, an LED turning-on-and-off circuit 120, a current source 121 and an LED 122 together constitute a circuit for display. The light-receiving element 110 receives the object light transmitted through the picture-taking lens when the mirror before being released is in its downward position and reflected by the mirror. The variable resistor 108 and the voltage converting circuit 109 receive the preset value $A_{VM}$ as input, and the light-receiving element 110 and the metering circuit 111 produce a signal indicative of the $B_V$ value. The operational circuit 115 operates $T_{VAM} = B_V + S_V - A_{VM}$ from $A_{VM}$, $B_V$ and the $S_V$ of the variable resistor 114. The variable resistor 113 shifts the output of the variable resistor 114 by a constant α and therefore, the output of the variable resistor is $S_V + α$. Accordingly, the comparator 118 judges whether the condition that $T_{VAM} \geq α + S_V$ is satisfied or not. In accordance with the judgment, the operation which will be described later is carried out.

Figures 5A, 5B:
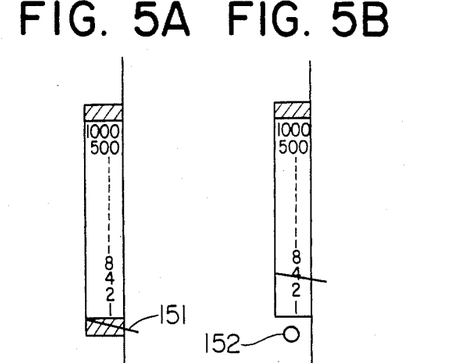
FIGS. 5A and 5B show the display within the finder.

The light-receiving element 101 meters the light reflected by the film surface or the shutter curtain surface, opens the switch SW102 at the timing of shutter opening and integrates the quantity of light by the integrator 104. The comparator 106 deenergizes the rearward shutter curtain restraining magnet 107 when the quantity of light has become proper with the film speed voltage produced by the film speed information resistor 114 and the current source 112 being as the reference voltage. The light-receiving element 110, which lies within the finder, makes the quantity of light being displayed into a metering output by the metering circuit 111, and such metering output, together with the aperture voltage produced by the aperture information resistor 108 and the voltage converting circuit 109 and the ASA voltage produced by the current source 112 and the film speed information resistor 114, is operated by the operational circuit 115 and drives the meter 117 for effecting exposure display through the meter follower 116. The comparator 118 compares the meter voltage with a warning voltage made by the warning level adjusting resistor 113 and ASA voltage, and delivers a signal to the LED turning-on-and-off circuit 120 through the meter follower 116 and the inverter 119. Assuming such brightness that the metering limit of the integrating circuit 104 is 1 sec. for ASA100, a pointer 151 moves downwardly correspondingly to the brightness as shown in FIG. 5A, and when the limit is exceeded, the pointer enters the hatching portion showing UNDER, thus indicating that the brightness is not extremely right. When the film speed is higher than ASA100, a voltage corresponding thereto is applied as input to the comparator 118 from the resistor 113 and therefore, when the limit is exceeded, the follower 116 is deenergized and the pointer of the meter 117 enters the area of UNDER. At the same time, the LED 122 is turned on and off by the LED turning-on-and-off circuit 120 to provide low brightness warning. The display in that case is shown in FIG. 5B, wherein a low brightness warning LED 152 is turned on and off. This LED may be used in common to a strobo charging signal display LED.

In this manner, by causing the meter pointer not to move or by causing the meter pointer to move completely, low brightness warning can be carried out as in the embodiment of FIG. 1. Further, a discrete LED may be turned on and off as display, whereby confirmation can be made even if the field of view is dark. Of course, the use of a buzzer or the like as a more positive warning would occur to mind.

Also, when the aforementioned low brightness warning is being generated, the release inhibiting means or the like of the camera may be operated to render the release impossible, thereby preventing erroneous exposure during low brightness.

We claim:
1. A camera in which light-sensing means is exposed to the light from an object to be photographed passed through stop means, said camera including:
 (a) means for setting the aperture value of said stop means;
 (b) means for driving said stop means in a direction in which the aperture value of said stop means is coincident with the aperture value set by said setting means, prior to the exposure of said light-sensing means;
 (c) metering means including a light-receiving element adapted to receive the light from said object passed through said stop means and produce an output corresponding to the intensity of the received light, said metering means producing a metering output corresponding to the brightness of said object on the basis of the output of said light-receiving element;
 (d) means for controlling the exposure time of said light-sensing means in order that said light-sensing means may obtain a proper exposure, on the basis of the metering output after said stop means has been driven by said driving means; and (e) discriminating means for discriminating, prior to the driving of said stop means, that the intensity of the light received by said light-receiving element after the termination of the driving of said stop means is lower than a predetermined value, on the basis of the metering output before said stop means is driven by said driving means, and putting out a discrimination signal.

2. A camera according to claim 1, wherein said predetermined value is determined by the dynamic range of said light-receiving element relative to the intensity of the light received by said light-receiving element.

3. A camera according to claim 1, further including means responsive to said discrimination signal to display that the intensity of the light received to said light-receiving element after the terminaton of the driving of said stop means is lower than said predetermined value.

4. A camera according to claim 1, wherein said discrminating means includes:
means for detecting the photosensitivity of said light-sensing means;
means for detecting the exposure time of said light-sensing means controlled by said exposure time control means, on the basis of said aperture value set by said setting means, said detected photosensitivity of said light-sensing means and the metering output produced before said stop means is driven by said driving means; and
means for calculating the intensity of the light received by said light-receiving element after the termination of the driving by said driving means, on the basis of said detected photosensitivity and exposure time.

5. A camera according to claim 1, wherein said discriminating means includes:
combination setting means for presetting a plurality of combinations of such photosensitivity of said light-sensing means and such exposure time of said light-sensing means controlled by said exposure control means that the intensity of the light received by said light-receiving element after the termination of the driving of said stop means is lower than said predetermined value;
first detecting means for detecting the photosensitivity of said light-sensing means;
second detecting means for detecting the exposure time of said light-sensing means controlled by said exposure control means, on the basis of said aperture value set by said setting means, said detected photosensitivity of said light-sensing means and the metering output produced before said stop means is driven by said driving means; and
said combination setting means including third detecting means for detecting that the combination of said detected photo-sensitivity and exposure time is included in said plurality of combinations preset by said combination setting means.

6. A camera in which light-sensing means is exposed to the light from an object to be photographed passed through stop means, said camera including:
(a) means for driving said stop means so that the aperture value of said stop means changes from a minimum aperture value to a maximum aperture value prior to the exposure of said light-sensing means;

(b) metering means including a light-receiving element adapted to receive the light from said object passed through said stop means and produce an output corresponding to the intensity of the received light, said metering means producing a metering output corresponding to the brightness of said object on the basis of the output of said light-receiving element;

(c) means for setting the exposure time of said light-sensing means;

(d) means for controlling the exposure time of said light-sensing means on the basis of the exposure time set by said setting means;

(e) means for putting out an aperture control signal indicative of an aperture value for obtaining the proper exposure of said light-sensing means, on the basis of the exposure time set by said setting means;

(f) detector means for detecting, on the basis of said metering output, that the aperture value of said stop means is coincident with the aperture value indicated by said aperture control signal, and putting out an aperture detection signal;

(g) means responsive to said aperture detection signal to prevent said driving means from driving said stop means; and (h) discriminating means for discriminating, prior to the driving of said stop means, that the intensity of the light received by said light-receiving element after said driving means has been prevented from driving by said preventing means is lower than a predetermined value, on the basis of the exposure time set by said setting means, and putting out a discrimination signal.

7. A camera according to claim 6, wherein said predetermined value is determined by the dynamic range of said light-receiving element relative to the intensity of the light received by said light-receiving element.

8. A camera according to claim 6, further including:
means responsive to said discrimination signal to display that the intensity of the light received by said light-receiving element after the termination of the driving of said stop means is lower than said predetermined value.

9. A camera according to claim 6, wherein said discriminating means includes:
means for detecting the photosensitivity of said light-sensing means;
means for detecting the exposure time of said light-sensing means set by said setting means; and
means for calculating the intensity of the light received by said light-receiving element after said driving means has been prevented from driving by said preventing means, on the basis of said detected photosensitivity and exposure time.

10. A camera in which light-sensing means is exposed to the light from an object to be photographed passed through stop means, said camera including:
(a) means for driving said stop means so that the aperture value of said stop means changes from a minimum aperture value to a maximum aperture value prior to the exposure of said light-sensing means;

(b) metering means including a light-receiving element adapted to receive the light from said object passed through said stop means and produce an output corresponding to the intensity of the received light, said metering means producing a metering output corresponding to the brightness of said object on the basis of the output of said light-receiving element;

(c) means for putting out an aperture value control signal indicative of an aperture value corresponding to said metering output before said stop means is driven by said driving means;

(d) detector means for detecting, on the basis of said metering output, that the aperture value of said stop means is coincident with the aperture value indicated by said aperture value control signal, and putting out an aperture detection signal;

(e) means responsive to said aperture detection signal to prevent said driving means from driving said stop means;

(f) means for controlling, on the basis of the metering output after said stop means has been driven by said driving means, the exposure time of said light-sensing means in order that said light-sensing means may obtain a proper exposure; and (g) discriminating means for discriminating, prior to the driving of said stop means, that the intensity of the light received by said light-receiving element after said driving means has been prevented from driving by said preventing means is lower than a predetermined value, on the basis of the metering output before said driving means drives said stop means, and putting out a discrimination signal.

11. A camera according to claim 10, wherein said predetermined value is determined by the dynamic range of said light-receiving element relative to the intensity of the light received by said light-receiving element.

12. A camera according to claim 10, further including:
means responsive to said discrimination signal to display that the intensity of the light received by said light-receiving element after the termination of the driving of said stop means is lower than said predetermined value.

13. A camera according to claim 10, wherein said discriminating means includes:
means for detecting the photosensitivity of said light-sensing means;
means for detecting the exposure time of said light-sensing means controlled by said exposure time control means, on the basis of said aperture value set by said setting means, said detected photosensitivity of said light sensing means and the metering output produced before said stop means is driven by said driving means; and
means for calculating the intensity of the light received by said light-receiving element after said driving means has been prevented from driving by said preventing means, on the basis of said detected photosensitivity and exposure time.

14. A camera according to claim 10, wherein said discriminating means includes:
combination setting means for presetting a plurality of combinations of such photosensitivity of said light-sensing means and such exposure time of said light-sensing means controlled by said exposure control means that the intensity of the light received by said light-receiving element after the termination of the driving of said stop means is lower than said predetermined value;
first detecting means for detecting the photosensitivity of said light-sensing means;
second detecting means for detecting the exposure time of said light-sensing means controlled by said exposure control means, on the basis of said aperture set by said setting means, said detected photosensitivity of said light-sensing means and the metering output produced before said stop means is driven by said driving means; and
said combination setting means including third detecting means for detecting that the combination of said detected photosensitivity and exposure time is included in said plurality of combinations preset by said combination setting means.

15. A camera including means for exposing light-sensing means to the light from an object to be photographed passed through stop means, said stop means being capable of manually setting an aperture value, said exposing means being capable of manually setting the exposure time of said light-sensing means, said camera including:

(a) metering means including a light-receiving element adapted to receive the light from said object passed through said stop means and produce an output corresponding to the intensity of the received light, said metering means producing a metering output corresponding to the brightness of said object on the basis of the output of said light-receiving element;

(b) means for putting out a first aperture value signal indicative of the aperture value by said manual setting;

(c) means for putting out a second aperture value signal indicative of an aperture value for obtaining the proper exposure of said light-sensing means, on the basis of the exposure time of said light-sensing means by said manual setting;

(d) means for putting out a third aperture value signal indicative of an aperture value corresponding to said metering output, prior to the exposure of said light-sensing means;

(e) selector means for selecting and putting out one of said first, second and third aperture value signals;

(f) aperture control means for controlling the aperture diameter prior to the exposure of said light-sensing means with the aperture value indicated by the output of said selector means being as a controlled value;

(g) exposure time control means for controlling the exposure time of said light-sensing means on the basis of the metering output after the control of the aperture diameter by said aperture control means;

(h) means for producing an exposure information output corresponding to the aperture value controlled by said aperture control means; and (i) discriminating means for discriminating, prior to the control of the aperture diameter by said aperture control means, that the intensity of the light received by said light-receiving element after the control of the aperture diameter by said aperture control means is lower than a predetermined value, on the basis of said exposure information output, and putting out a discrimination signal.

16. A camera according to claim 15, wherein said predetermined value is determined by the dynamic range of said light-receiving element relative to the intensity of the light received by said light-receiving element.

17. A camera according to claim 15, further including means responsive to said discrimination signal to display that the intensity of the light received by said light-receiving element after the control of the aperture diameter by said aperture control means is lower than said predetermined value.

* * * * *

UNITED STATES PATENT AND TRADEMARK OFFICE
CERTIFICATE OF CORRECTION

PATENT NO. : 4,509,847
DATED : April 9, 1985
INVENTOR(S) : OSAMU MAIDA, ET AL.

It is certified that error appears in the above-identified patent and that said Letters Patent is hereby corrected as shown below:

Column 5, line 6, after "(2)" delete "PS".

Column 7, line 31, before "is" insert --where $T_{VAO}$--.

Column 10, line 16, change "$T_{VAM} - S_V - \alpha$" to --$T_{VAM} - S_V < \alpha$--;

line 64, both instances, change "$\leq$" to -->--.

Column 11, line 48, change "$V_{VS3}$" to --$T_{VS3}$--.

*Signed and Sealed this*

*Twenty-seventh* Day of *August 1985*

[SEAL]

*Attest:*

DONALD J. QUIGG

*Attesting Officer*    *Acting Commissioner of Patents and Trademarks*